United States Patent

[11] 3,624,071

[72] Inventors Earl Reeder
Nutley;
Leo Henryk Sternbach, Upper Montclair, both of N.J.
[21] Appl. No. 728,821
[22] Filed May 13, 1968
[45] Patented Nov. 30, 1971
[73] Assignee Hoffman-La Roche Inc.
Nutley, N.J.

[54] OXIDATIVE PREPARATION OF 2,3-DIHYDRO-1,4-BENZODIAZEPINES
8 Claims, No Drawings

[52] U.S. Cl..................................................... 260/239 BD,
260/296 B, 260/999
[51] Int. Cl..................................................... C07d 41/08

[50] Field of Search............................................. 260/239 BD

[56] References Cited
OTHER REFERENCES
Fryer et al., J. Org. Chem., vol. 30, 1308–1310 (1965)

*Primary Examiner*—Alex Mazel
*Assistant Examiner*—Joseph A. Narcavage
*Attorneys*—Samuel L. Welt, Jon S. Saxe, Bernard S. Leon, William G. Isgro and George M. Gould ABSTRACT: 2,3,4,5-Tetrahydro-benzodiazepines are converted into 2,3-dihydro-1,4-benzodiazepines by treatment with a selected oxidizing agent. Suitable oxidizing agents include diethylazodicarboxylate, quinones such as 2,3-dichloro-5,6-dicyanobenzoquinine, 5,6chloranil and alkali metal hypohalites, such as alkali metal hypoiodites, e.g., sodium hypoiodite.

OXIDATIVE PREPARATION OF 2,3-DIHYDRO-1,4-BENZODIAZEPINES

BACKGROUND OF THE INVENTION

The process of the present invention relates to a novel oxidation technique for effecting the conversion of 2,3,4,5-tetrahydro-1,4-benzodiazepines into 2,3-dihydro-1,4-benzodiazepines.

The resulting compounds obtained from the oxidation process of the present invention, i.e., the 2,3-dihydro-1,4-benzodiazepines, are known compounds and are useful as anticonvulsants, muscle relaxants and sedative agents. The pharmacological usefulness of these compounds in now well documented in literature.

DETAILED DESCRIPTION OF THE INVENTION

The present invention relates to a process for the oxidation of 2,3,4,5-tetrahydro-1,4-benzodiazepines utilizing certain select oxidizing agents. More particularly, the present invention relates to a process wherein a compound of the following formula:

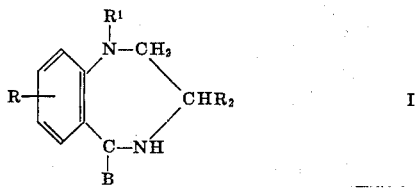

where R is hydrogen, halogen, nitro and trifluoromethyl; $R_1$ and $R_2$ are hydrogen and lower alkyl and B is hydrogen, phenyl, substituted phenyl and pyridine is treated with an oxidizing agent selected from the group consisting of diethylazodicarboxylate, a quinone such as 2,3-dichloro-5,6-dicyanobenzoquinone, chloranil and alkali metal hypohalite, such as alkali metal hypoiodite, e.g., sodium hypoiodite, to produce a compound of the following formula:

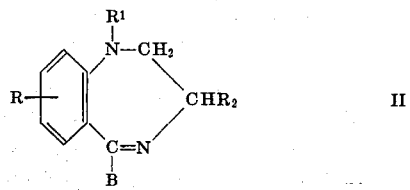

where R, $R_1$, $R_2$ and B are as above.

In a particularly advantageous aspect of the present process, compounds wherein R is halogen, $R_1$ is lower alkyl, $R_2$ is hydrogen and B is phenyl are utilized. In a more preferred embodiment of the present process, R is a halogen which is located at the seven-position on the benzodiazepine ring structure. In a most preferred aspect of the present invention R is a chlorine atom located at the seven-position as above, $R_1$ is methyl, $R_2$ is hydrogen and B is phenyl, e.g., thus describing a starting material identified as 7-chloro-2,3,4,5-tetrahydro-1-methyl-5-phenyl-1H-1,4-benzodiazepine of formula I above and a final product identified as 7-chloro-2,3-dihydro-1-methyl-5-phenyl-1H-1,4-benzodiazepine of formula II above. In a further preferred embodiment, R is 7-chloro, $R_1$ is methyl, $R_2$ and B are hydrogen so as to produce as final product 7-chloro-2,3-dihydro-1-methyl-1H-1,4-benzodiazepine.

In a further aspect of the present invention, when B is pyridyl, it is preferred that the radical be a 2-pyridyl. Furthermore, when B is nitrophenyl, it is preferred that the nitro be at the 2' position. Additionally, when B is halophenyl, it is preferred that the halo group be at the 2' position and more preferably that the halo group be a fluoro group at the 2' position.

The term "halogen" as used herein is meant to include all four halogen forms, i.e., chlorine, fluorine, bromine, and iodine. The term "lower alkyl" as utilized herein includes both straight and branched chain hydrocarbon radicals containing from one to seven, most preferably one to four carbon atoms. Examples of such lower alkyl groups include methyl, ethyl, propyl, isopropyl and the like.

The process of the present invention will generally be carried out in the presence of an organic solvent. The selection of such solvent is not critical and thus organic solvents conventionally used in the art may be employed. Representative organic solvents useful herein include the following: aromatic or aliphatic hydrocarbons, dilute alkanols, dioxane, etc.

In a particularly preferred embodiment of the present process, when diethylazodicarboxylate, a quinone or chloranil is used as oxidizing agent; the solvent of preference will be an aromatic hydrocarbon such as benzene, toluene, xylene, and the like. A particularly preferred organic solvent for use with these oxidizing agents is benzene.

For the particular embodiment wherein an alkali metal hypohalite is utilized as oxidizing agent, it is preferred to utilize a lower alkanol as the solvent of preference. A particularly preferred lower alkanol for this purpose is methanol.

In general, there is no criticality attached to the selection of reaction conditions of temperature and pressure, However, it is preferred to conduct the reaction at elevated temperatures, e.g., at about the reflux temperature of the reaction medium. However, it is possible to utilize a temperature within the general range of about 0° to 100° C. When the oxidizing agent utilized in the process is an alkali metal hypohalite such as sodium hypoiodite, it will generally be preferred to operate at a temperature in the range of from about room temperature to about 50°. A most convenient temperature for this reaction in this particular embodiment of the present invention will be about room temperature.

Similarly, the selection of pressure conditions is not critical to the operability of the present process. Generally, for purposes of convenience, atmospheric pressure will be preferred. However, suitable pressures above or below atmospheric pressure may also be utilized.

The process of the present invention is more clearly illustrated by reference to the following examples wherein all temperatures are stated in degrees Centigrade.

EXAMPLE 1

Diethylazodicarboxylate as Oxidizing Agent for 7-chloro-2,3,4,5-Tetrahydro-1-methyl-5-phenyl-1H-1,4-Benzodiazepine To a solution of 1.3 g. (5 mmoles of 7-chloro-2,3,4,5-tetrahydro-1-methyl-5-phenyl-1H-1,4-benzodiazepine in 20 ml. of dry benzene was added 0.87 g. (5 mmoles) of diethylazodicarboxylate. The reaction mixture was stirred and refluxed for 1 hour, then cooled. The formed insoluble diethylhydrazodicarboxylate (m.p. 134°) was separated by filtration and discarded. The filtrate was concentrated in vacuo to dryness and the residue crystallized from a mixture of ether and petroleum ether. The first crop of crystals was again discarded.

Further concentration yielded 7-chloro-2,3-dihydro-1-methyl-5-phenyl-1H-1,4-benzodiazepine melting at 95°–97°.

EXAMPLE 2

2,3-Dichloro-5,6-Dicyanobenzoquinone as Oxidizing Agent

To a solution of 1 g. (3.7 mmoles) of 7-chloro-2,3,4,5-tetrahydro-1-methyl-5-phenyl-1H-1,4-benzodiazepine in 50 ml. of benzene was added a solution of 1 g. (4.4 mmoles) of 2,3-dichloro-5,6dicyanobenzoquinone in 25 ml. benzene. The reaction mixture was stirred and refluxed for 1 hour and filtered. The filtrate was extracted with dilute hydrochloric acid. The aqueous acidic layer was separated, made alkaline and extracted with ether. The ether layer was separated, dried and concentrated in vacuo and the residue was crystallized from a mixture of ether and petroleum ether to give the desired 2,3-dihydro product.

EXAMPLE 3

Chloranil as an Oxidizing Agent

To a solution of 1 g. (3.7 mmoles) of 7-chloro-2,3,4,5-tetrahydro-1-methyl-5-phenyl-1H-H-1,4-benzodiazepines in 50 ml. of benzene was added a solution of 1 g. (4.1 mmoles) of chloranil. The reaction mixture was stirred and refluxed for 2 hours, then cooled and diluted with water. The benzene layer was separated and extracted with dilute hydrochloric acid. The acid extract was made alkaline and extracted with ether. The ether extract was dried and concentrated in vacuo to dryness.

Crystallization of the residue from a mixture of ether and petroleum ether gave the desired 2,3-dihydro product.

EXAMPLE 4

Sodium Hypoiodite as Oxidizing Agent

To a stirred solution of 2.5 g. (20 mmoles) of iodine in 100 ml. methanol was added 60 ml. of 3N sodium hydroxide and then 2.6 g. (10 mmoles) of 7-chloro-2,3,4,5-tetrahydro-1-methyl-5-phenyl-1H-1,4-benzodiazepine dissolved in 50 ml. of methanol. The reaction mixture was stirred at room temperature for 1 hour and then concentrated in vacuo to a small volume. The concentrate was diluted with water and extracted with ether. The ether layer was extracted with dilute hydrochloric acid and discarded. The aqueous acid layer was made alkaline and extracted with ether. The organic layer was separated, dried and concentrated in vacuo to dryness. Crystallization of the residue from a mixture of ether and petroleum ether gave the desired 2,3-dihydro product. The mother liquors were concentrated to dryness, dissolved in 15 ml. petroleum ether and put on a column containing 20 g. of Woelm I alumina. The material was eluted with petroleum ether. Concentration of the eluate (1.5 l. and crystallization of the residue gave additional 2,3-dihydro product.

EXAMPLE 5

Oxidation of 7-chloro-2,3,4,5-tetrahydro-1-methyl-1H-1,4-benzodiazepine with diethylazodicarboxylate.

A mixture of 7-chloro-2,3,4,5-tetrahydro-1-methyl-1H-1,4-benzodiazepine (1.1 gm.) and diethylazodicarboxylate (1.04 gm.) in benzene (10 ml.) was refluxed for 6 hours. After cooling overnight, the precipitate of diethylhydrazinodicarboxylate was removed by filtration. Evaporation of the filtrate gave 7-chloro-2,3-dihydro-1-methyl-1H-1,4-benzodiazepine, identified with an authenic sample by thin layer chromatography.

EXAMPLE 6

Oxidation of 7-chloro-2,3,4,5-tetrahydro-1-methyl-1H-1,4-benzodiazepine with 2,3-dichloro-5,6-dicyano-1,4-benzoquinone (DDQ)

A solution of 7-chloro-2,3,4,5-tetrahydro-1-methyl-1H-1,4-benzodiazepine (1 gm.) in dry benzene (50 ml.) was treated with a solution of DDQ ((1.4 ml.) was treated with a solution of DDQ (1.4 gm.) in dry benzene (50 ml.). The mixture was refluxed for 1 hour, then cooled and filtered. The residue was stirred with a mixture of aqueous N-potassium hydroxide and methylene chloride; the organic extract was washed with water, dries (magnesium sulfate) and evaporated, to give the crude product, which was purified by chromatography on 2 mm. thick gel of silica gel F–254 (E. Merck), by development with chloroform-methanol (1:1). The areas containing product were identified by examination under ultraviolet light (254 mu), and were scraped off and extracted with a mixture of ethanol and saturated aqueous sodium bicarbonate. Concentration of the extract, following by extraction with methylene chloride, afforded 7-chloro-2,3-dihydro-1-methyl-1H-1,4-benzodiazepine, which was converted into the hydrochloride by treatment with excess methanolic hydrogen chloride and ether. Recrystallization from methanol-ether gave the hydrochloride as yellow prisms, m.p. 227°–230° C.

We claim:

1. A process for the preparation of compounds of the formula:

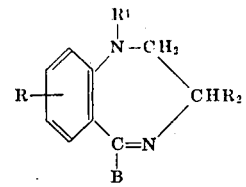

wherein R is hydrogen, halogen, nitro and trifluoromethyl; $R_1$ and $R_2$ are hydrogen and lower alkyl and B is hydrogen, pyridyl, phenyl and phenyl substituted by a member of the group consisting of halogen and nitro which comprises treating a compound of the formula

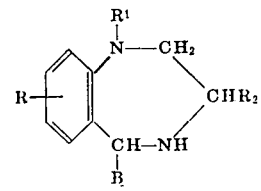

wherein R, $R_1$, $R_2$ and B are as described above with an oxidizing agent selected from the group consisting of diethylazodicarboxylate, 2,3-dichloro-5,6dicyanobenzoquinone, 2. The process of claim 1 wherein said alkali metal hypohalite is an alkali metal hypoiodite.

3. The process of claim 2 wherein said alkali metal hypoiodite is sodium hypoiodite.

4. The process of claim 1 wherein R is halogen located at the seven-position on the benzodiazepine ring.

5. The process of claim 4 wherein R is chloro, $R_1$ is methyl, $R_2$ is hydrogen and B is hydrogen.

6. The process of claim 4 wherein R is chloro, $R_1$ is methyl, $R_2$ is hydrogen and B is phenyl.

7. The process of claim 1 wherein said reaction is carried out in an aromatic hydrocarbon as solvent and diethylazodicarboxylate, 2,3-dichloro-5,6-dicyanobenzoquinone or chloranil is the oxidizing agent.

8. The process of claim 1 wherein said reaction is carried out in a lower alkanol solvent and an alkali metal hypohalite in aqueous solution is used as the oxidizing agent.

* * * * *

PO-1050
(5/69)

UNITED STATES PATENT OFFICE
CERTIFICATE OF CORRECTION

Patent No. 3,624,071      Dated November 30, 1971

Inventor(s) Reeder and Sternbach

It is certified that error appears in the above-identified patent and that said Letters Patent are hereby corrected as shown below:

Claim 1 - Column 4 line 43

"dicyanobenzoquinone,"

should be dicyanobenzoquinone, chloranil and an alkali metal hypohalite.

Signed and sealed this 2nd day of May 1972.

(SEAL)
Attest:

EDWARD M. FLETCHER, JR.
Attesting Officer

ROBERT GOTTSCHALK
Commissioner of Patents